Sept. 27, 1966 H. M. KNICKERBOCKER 3,276,016

APPARATUS FOR THE CALIBRATION OF RADAR EQUIPMENT

Filed Sept. 3, 1964 2 Sheets-Sheet 1

INVENTOR.
HARVEY M. KNICKERBOCKER
BY
Fordyce A. Bothwell
ATTORNEY

APPARATUS FOR THE CALIBRATION OF RADAR EQUIPMENT

Filed Sept. 5, 1964 2 Sheets-Sheet 2

INVENTOR.
HARVEY M. KNICKERBOCKER
BY
Fordyce A. Bothwell
ATTORNEY

United States Patent Office
3,276,016
Patented Sept. 27, 1966

3,276,016
APPARATUS FOR THE CALIBRATION OF RADAR EQUIPMENT

Harvey M. Knickerbocker, National City, Calif., assignor to Philco Corporation, Philadelphia, Pa., a corporation of Delaware Filed Sept. 3, 1964, Ser. No. 394,240
12 Claims. (Cl. 343—17.7)

This invention relates to apparatus for the proper calibration of range marks in radar repeaters, which is essential to range accuracy of the equipment.

In the past, apparatus for this purpose has been so cumbersome as to be impractical from the standpoint of portability. Consequently there have been many instances of serious loss of time occasioned by the necessity to calibrate radar equipment by means of apparatus that had to be procured from a remote location.

The principal object of the present invention is to provide a light-weight, compact, readily-portable calibration apparatus which can be available at all times and thus eliminates the loss of time incident to procurement.

Apparatus for the calibration of conventional radar equipment is required to produce a trigger pulse and mark pulses in precise time relation. The apparatus provided by this invention comprises a source of control signal, such as a free-running multivibrator, a crystal oscillator which is pulsed in response to said control signal, and means for processing the output of said oscillator to form mark pulses. The apparatus further comprises a one-shot multivibrator which is triggered by said control signal, and means for processing the output of said one-shot multivibrator to form the desired trigger pulse.

Figure 1:
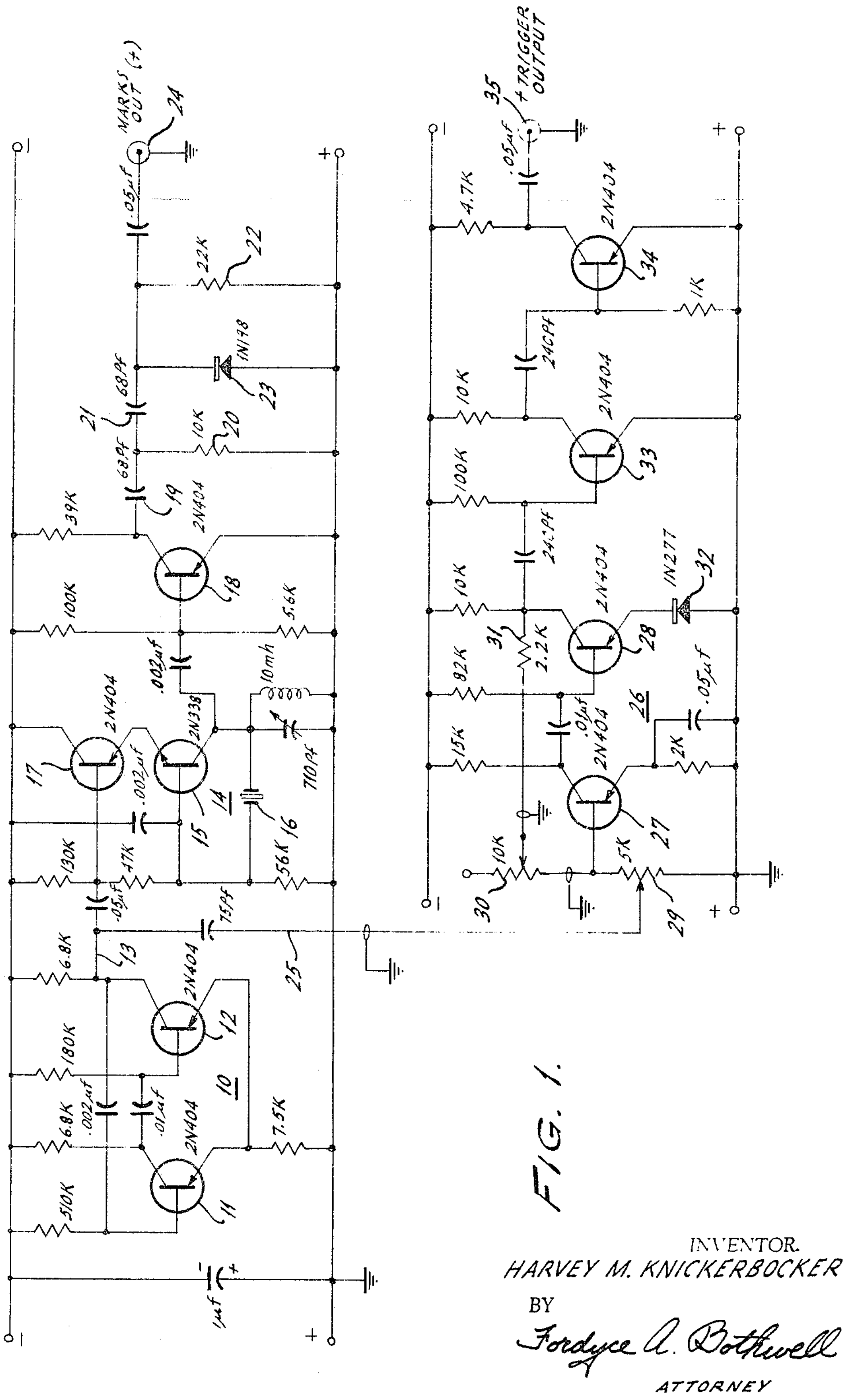
Figure 2:
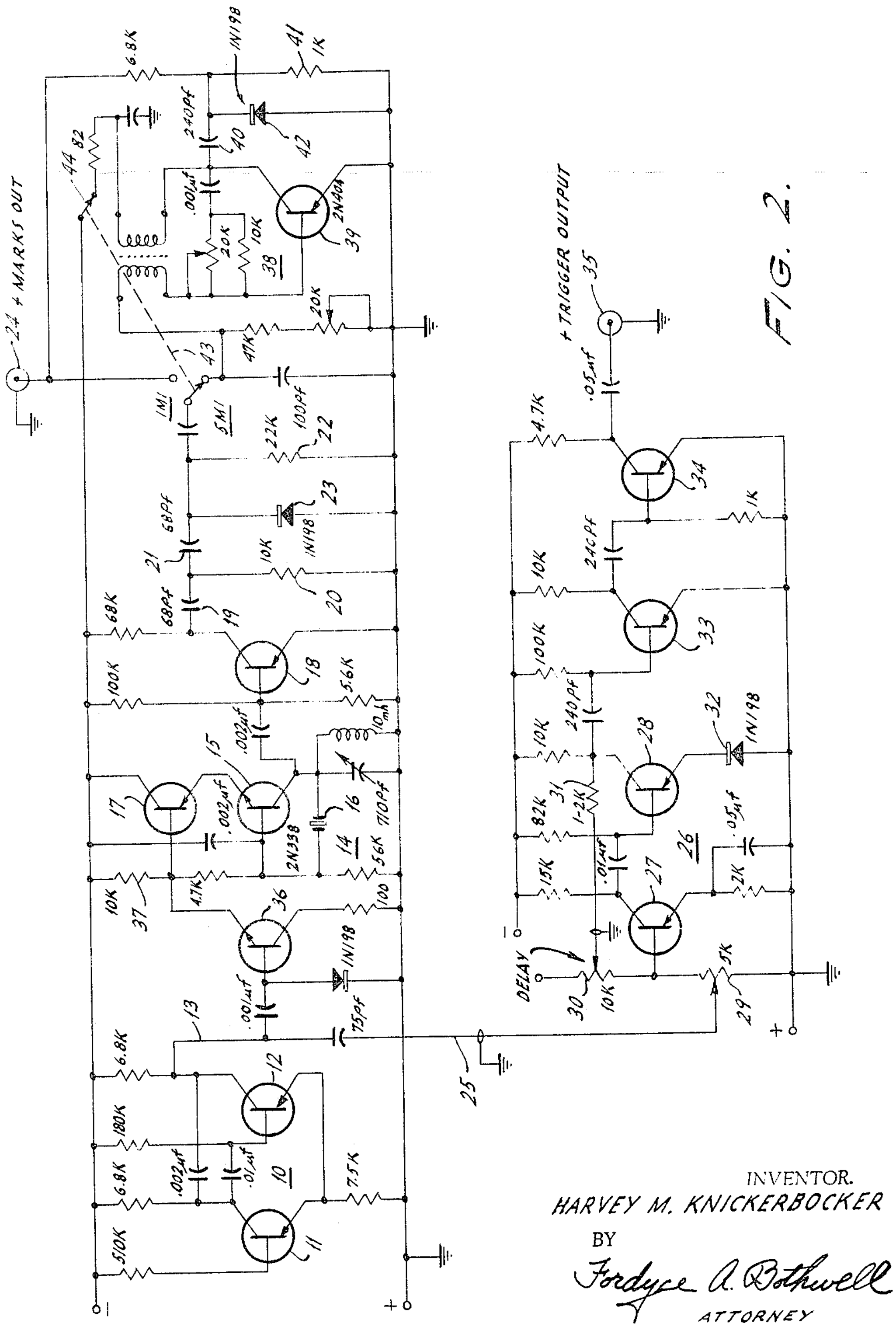

The invention may be fully understood from the following detailed description with reference to the accompanying drawings, wherein FIG. 1 is a schematic diagram of one embodiment of the invention; and FIG. 2 is a similar diagram of a modified form of the same apparatus.

Referring first to FIG. 1, in the apparatus shown the source of control signal is a conventional free-running multivibrator 10 comprising transistors 11 and 12 and the associated elements and connections as shown. The multivibrator 10 produces a square wave control signal which appears at its output connection 13. The frequency or repetition rate of the multivibrator is determined by the circuit components and, with the values indicated, is approximately 625 c.p.s.

There is also provided a crystal oscillator 14 comprising transistor 15, crystal 16 and the associated elements and connections as shown. In the illustrated embodiment, the operating frequency of oscillator 14 is 81.94 kc. which for convenience may be regarded as 82 kc. The oscillator is turned on and off through a switching transistor 17 which is biased so as to be normally conducting. The square wave output of multivibrator 10 is applied to the base of transistor 17, and the positive portion of the square wave cuts off said transistor. The oscillator 14 is thus started and stopped by the switching action of transistor 17 under control of multivibrator 10.

The output of oscillator 14 is supplied to the base of transistor 18 which is a limiting amplifier in that it sufficiently limits the 82 kc. signal to provide an output which is limited in the positive half-cycles. This waveform is integrated by capacitor 19 and resistor 20. Further integration is provided by capacitor 21 and resistor 22, with the negative peaks being clipped by diode 23, providing an output to terminal 24. The output has a sharp spike on its leading edge and falls off in an exponential curve quite rapidly, providing a peak that is excellent for calibrating a repeater. Mark pulses of this character thus appear at output terminal 24.

Referring back to the free-running multivibrator 10, the output thereof at 13 is also applied over conductor 25 to a one-shot multivibrator 26 which produces the desired trigger pulse and which comprises transistors 27 and 28 and the associated circuit components and connections. The input level control 29 provides the main control over stability between the trigger pulse and the mark pulses. It provides the proper amplitude of signal to trigger transistor 27 and it prevents triggering of the latter by an undesired component from oscillator 14. The trigger for transistor 27 is an integrated spike caused by the negative-going edge of the square wave output from multivibrator 10. However an undesired 82 kc. component from oscillator 14 is superimposed on the output waveform and produces undesired spikes that tend to trigger transistor 27. Proper adjustment of control 29 attenuates these spikes and prevents undesired triggering of the one-shot multivibrator 26.

Adjustable resistor 30 is a delay control and is in the feedback path between the collector of transistor 28 and the base of transistor 27. It determines the duration of the output pulse of the one-shot multivibrator, and it is used to position the marks in respect to the trigger. Resistor 31 increases the useable range of the delay control 30.

Diode 32 improves the stability of multivibrator 26 by preventing discharge of the coupling capacitor through internal leakage of transistor 28. To explain this, in the one-shot multivibrator the delay, or recovery time, of transistor 28 is determined primarily by the size of the coupling capacitor and the feedback bias (resistors 30 and 31). Without the diode 32, when transistor 28 is cut off its internal leakage provides an auxiliary discharge path for the coupling capacitor through the base-to-emitter-to-ground path. The effect of this is to change the discharge period and thus vary the recovery time. However with diode 32 present, when the base is more positive than the emitter the diode is reverse biased so that it effectively opens the emitter-to-ground connection. It thus provides greater stability of the recovery time.

The output pulse of the one-shot multivibrator 26 is amplified in two stages comprising transistors 33 and 34 and the associated circuit components and connections. Transistor 33 is biased into the normally conducting condition. The positive-going (trailing) edge of the one-shot multivibrator output drives transistor 33 into cut-off and it recovers quite rapidly due to a short time constant of the input coupling capacitor and the base-to-ground leakage path of the transistor. The cut-off and rapid recovery of transistor 33 produces a spike that is essentially square of about 10 volts amplitude (negative going) and from 4 to 7 microseconds wide. Since a positive trigger is required, this pulse is supplied to transistor 34 which is biased so as to be normally cut off. The negative pulse causes conduction of transistor 34, producing an inverted or positive-going replica of the signal at the collector of transistor 33. This signal is supplied to the trigger output terminal 35.

If a negative trigger were required, it could be derived from the collector of transistor 33, the second transistor stage being then omitted.

The power supply for the apparatus may be a battery or a transformer-rectifier unit. The apparatus will operate on any direct voltage from 12 to 24 volts D.C.

The apparatus including the power supply may be contained in a small box. For example, calibration units have been constructed in 3″ x 4″ x 6″ boxes. The apparatus is thus readily portable.

The apparatus as shown in FIG. 1 produces at output terminal 24 calibration mark pulses whose time spacing (of two consecutive pulses) is representative of one mile. To calibrate a radar repeater, the marks output terminal 24 is connected to the video input of the repeater, and the trigger output terminal 35 is connected to the trigger input of the repeater. Then with the repeater and calibrator both energized the delay control 30 is adjusted until the first calibrator mark aligns with the first repeater internal mark. Then it is visually determined whether successive repeater marks align with the successive calibrator marks. If they do not, the repeater oscillator is adjusted until alignment is achieved.

Referring now to FIG. 2, the apparatus there shown is the same as that of FIG. 1 with certain additions. The addition of transistor 36 serves to change the switching action of transistor 17 in such a manner as to cut off oscillations of oscillator 14 momentarily at the same time that the one-shot multivibrator 26 is triggered. This extends the number of useful range marks. Transistor 36 is biased to cut-off, and transistor 17 is normally conducting. The negative-going edge of the square wave from the free-running multivibrator 10 that triggers the one-shot multivibrator 26 causes transistor 36 to conduct momentarily in an action similar to the above-described action of trigger amplifier 33. This conduction of transistor 36 and the consequent voltage drop across resistor 37 cuts off transistor 17 for a short period of time. Recovery occurs quickly and oscillations start prior to the trigger and continue until the next negative excursion of the free-running multivibrator 10. This allows useable marks to occur at the output during the portion of the free-running multivibrator cycle when they would be cut off were it not for the addition of transistor 36.

A further modification of the apparatus as shown in FIG. 2 is the adaptation of the system to produce marks of different time spacings, e.g. 1 mile marks and 5 mile marks, for calibration of different equipments. To this end additional circuitry is provided comprising a blocking oscillator 38, including transistor 39 and associated elements, integrating elements 40 and 41, and clipping diode 42. Ganged switches 43 and 44 are positioned according to the mark pulses desired.

With the switches in the position as shown, the blocking oscillator 38 is triggered by every fifth supplied to it. This results from proper selection of the RC time constant, it being well understood that a blocking oscillator can thus be made to fire on selected pulses. The natural free running rate of the blocking oscillator 38 is approximately 16.3 kc., and the triggering rate is 16.388 kc. as determined by each fifth input pulse.

With the 5-mile setting, the calibration of a radar repeater is the same as described above, the only difference being that the repeater is switched to 5-mile marks.

While the invention has been described with reference to the illustrated embodiments, it will be understood that the invention is not limited thereto but contemplates such modifications and further embodiments as may occur to those skilled in the art.

I claim:

1. Apparatus for the calibration of radar equipment, comprising a source of control signal, a crystal oscillator, means for pulsing said oscillator in response to said control signal, means for processing the output of said oscillator to form mark pulses, a one-shot multivibrator coupled to said source to be driven thereby, and means for processing the output of said one-shot multivibrator to form a trigger pulse.

2. Apparatus according to claim 1, wherein said source of control signal is a free-running multivibrator.

3. Apparatus according to claim 1, wherein said pulsing means comprises a switching transistor which is turned on and off in response to said control signal.

4. Apparatus for the calibration of radar equipment, comprising a source of control signal, a crystal oscillator, means for pulsing said oscillator in response to said control signal, means for processing the output of said oscillator to form mark pulses, a one-shot multivibrator coupled to said source to be driven thereby, manually-operable means for adjusting the level of the input to said one-shot multivibrator, and means for processing the output of said one-shot multivibrator to form a trigger pulse.

5. Apparatus for the calibration of radar equipment, comprising a source of control signal, a crystal oscillator, means for pulsing said oscillator in response to said control signal, means for processing the output of said oscillator to form mark pulses, a one-shot multivibrator coupled to said source to be driven thereby, manually-adjustable means for determining the duration of the output pulse of said one-shot multivibrator, and means for processing the output of said one-shot multivibrator to form a trigger pulse.

6. Apparatus according to claim 5, wherein said one-shot multivibrator includes a pair of cascaded transistors and a feedback circuit, and said manually-adjustable means comprises a variable resistor in said feedback circuit.

7. Apparatus for the calibration of radar equipment, comprising a source of control signal, a crystal oscillator, means for pulsing said oscillator in response to said control signal, means for processing the output of said oscillator to form mark pulses, a one-shot multivibrator coupled to said source to be driven thereby, manually-operable means for adjusting the level of the input to said one-shot multivibrator, manually-adjustable means for determining the duration of the output pulse of said one-shot multivibrator, and means for pocessing the output of said one-shot multivibrator to form a trigger pulse.

8. Apparatus according to claim 7, wherein said source of control signal is a free-running multivibrator.

9. Apparatus according to claim 8, wherein said one-shot multivibrator includes a pair of cascaded transistors and a feedback circuit, and said manually-adjustable means comprises a variable resistor in said feedback circuit.

10. Apparatus for the calibration of radar equipment, comprising a source of control signal, a crystal oscillator, means for pulsing said oscillator in response to said control signal, means for utilizing the output of said oscillator to produce mark pulses having one of a plurality of selectable time spacings, a one-shot multivibrator coupled to said source to be driven thereby, and means for processing the output of said one-shot multivibrator to form a trigger pulse.

11. Apparatus according to claim 10, including integrating means connected to receive the output of said oscillator to produce mark pulses having a certain time spacing, and means connectable at will to said integrating means for producing mark pulses having a different time spacing.

12. Apparatus according to claim 11, wherein said last-recited means comprises a blocking oscillator.

No references cited.

CHESTER L. JUSTUS, *Primary Examiner.*

RODNEY D. BENNETT, *Examiner.*